United States Patent
Excoffier et al.

(10) Patent No.: US 11,989,996 B2
(45) Date of Patent: May 21, 2024

(54) DEVICE FOR STORING OBJECTS AND METHOD USING SUCH A DEVICE

(71) Applicant: ORANGE, Issy-les-Moulineaux (FR)

(72) Inventors: David Excoffier, Chatillon (FR); Sébastien Bolle, Chatillon (FR); François-Gaël Ottogalli, Chatillon (FR); Geneviève Dijoux, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 919 days.

(21) Appl. No.: 16/969,732

(22) PCT Filed: Feb. 14, 2019

(86) PCT No.: PCT/FR2019/050325
§ 371 (c)(1),
(2) Date: Aug. 13, 2020

(87) PCT Pub. No.: WO2019/158862
PCT Pub. Date: Aug. 22, 2019

(65) Prior Publication Data
US 2021/0000275 A1    Jan. 7, 2021

(30) Foreign Application Priority Data

Feb. 16, 2018 (FR) ...................................... 1851332
Dec. 10, 2018 (FR) ...................................... 1872615

(51) Int. Cl.
*G07F 17/12* (2006.01)
*A47G 29/14* (2006.01)
(Continued)

(52) U.S. Cl.
CPC ............ *G07F 17/12* (2013.01); *A47G 29/141* (2013.01); *E05G 1/10* (2013.01); *G06V 20/52* (2022.01);
(Continued)

(58) Field of Classification Search
None
See application file for complete search history.

(56) References Cited

U.S. PATENT DOCUMENTS

| 5,369,221 A | 11/1994 | Ramsden |
| 5,842,597 A | 12/1998 | Friedman et al. |
| (Continued) | | |

FOREIGN PATENT DOCUMENTS

FR    2851360 A1    8/2004

OTHER PUBLICATIONS

English translation of the Written Opinion of the International Searching Authority dated Apr. 16, 2019 for corresponding International Application No. PCT/FR2019/050325, filed Feb. 14, 2019.

(Continued)

*Primary Examiner* — Carlos Garcia
(74) *Attorney, Agent, or Firm* — David D. Brush; Westman Champlin & Koehler, P.A.

(57) ABSTRACT

A method and apparatus for managing storage of objects such as packages or the like. In particular, in a storage device includes at least one locker having a device for locking/unlocking the locker and a plurality of sensors designed to deliver data specific to the objects deposited in the locker. The method includes: receiving a request to store an object in a locker of the storage device; identifying an object type which matches the object to be stored; according to the object type identified, selecting, from the plurality of locker sensors, a set of sensors to be activated at least while the locker is in use; upon detecting that the locker is in use, activating the selected sensors in order to monitor the storage.

15 Claims, 4 Drawing Sheets

(51) Int. Cl.
*E05G 1/10* (2006.01)
*G06V 20/52* (2022.01)
*H04N 7/18* (2006.01)

(52) U.S. Cl.
CPC ....... *H04N 7/183* (2013.01); *A47G 2029/146* (2013.01); *A47G 2029/149* (2013.01)

(56) References Cited

U.S. PATENT DOCUMENTS

| | | | |
|---|---|---|---|
| 6,879,255 B1 | 4/2005 | Jezierski | |
| 7,295,110 B2 | 11/2007 | Hirel et al. | |
| 9,952,088 B2 * | 4/2018 | Pointeau | G01G 19/52 |
| 2015/0186840 A1 | 7/2015 | Suggs et al. | |
| 2016/0300187 A1 | 10/2016 | Kashi et al. | |

OTHER PUBLICATIONS

International Search Report dated Apr. 1, 2019 for corresponding International Application No. PCT/FR2019/050325, filed Feb. 14, 2019.

Written Opinion of the International Searching Authority dated Apr. 1, 2019 for corresponding International Application No. PCT/FR2019/050325, filed Feb. 14, 2019.

\* cited by examiner

DEVICE FOR STORING OBJECTS AND METHOD USING SUCH A DEVICE

CROSS-REFERENCE TO RELATED APPLICATIONS

This application is a Section 371 National Stage Application of International Application No. PCT/FR2019/050325, filed Feb. 14, 2019, the content of which is incorporated herein by reference in its entirety, and published as WO2019/158862 on Aug. 22, 2019, not in English.

FIELD OF THE DISCLOSURE

The present invention relates to a storage device for storing objects, the device typically comprising one or more lockers able to be locked or unlocked by authorized users, and to a method implementing such a storage device.

BACKGROUND OF THE DISCLOSURE

The growth in particular in sales, exchanges and loans via the Internet is leading to an increase in the number of packages to be delivered and delivery trucks. These packages are brought to the recipients' homes, or stored in hangars belonging to the carriers.

The increase in these deliveries is having a severe impact on road traffic (trucks causing congestion of roadways) and in fact on air pollution. It is also leading to time being wasted when delivery was not able to be completed due to absence, and when it is necessary to pick up the package from another location.

In this regard, it is possible to observe an overall change in consumer behavior, and there is generally a desire for a better quality of life (less pollution), to buy or borrow and to use more local goods and products (typically food produced locally and without excessively extensive means, or else everyday objects).

The share of the collaborative and/or peer-to-peer economy is also constantly growing, in accordance with a new model based on people sharing or exchanging goods (automobiles, housing, parking, hardware such as a drill or the like, etc.), services (carpooling, DIY, etc.), or knowledge (computer courses, learning communities, etc.), with a monetary exchange (sale, rental, service provision) or without a monetary exchange (donations, barter, volunteering), via networking (digital platform).

Nowadays, for example, there are many types of vending machines selling drinks, fruit and vegetables (eggs, cheese, bread, etc.), even ice cream or oysters. These vending machines are installed along roadsides or in local locations as producers and consumers convert to direct sales and to these local services linked to this new collaborative economy.

One technical problem with these vending machines is that these vending machines usually have only a single function, for the sale of consumable goods or of equipment specific to the type of vending machine. In fact, each vending machine is of a specific nature.

SUMMARY

The present invention aims to improve the situation.

To this end, it proposes a method, implemented by computer means, for managing the storage of objects, the method comprising, in a storage device comprising at least one locker including a locking/unlocking member for locking/unlocking the locker and a plurality of sensors designed to deliver data specific to the objects deposited in the locker:
  receiving a request to store an object in a locker of the storage device;
  determining a type of object corresponding to the object to be stored;
  selecting, on the basis of the determined type of object, a set of sensors from among the plurality of sensors of the locker to be activated at least during use of the locker;
  upon detecting use of the locker, activating the selected sensors in order to monitor the storage.

Such an implementation makes it possible in particular, by selecting sensors suitable for the type of object to be stored, to offer a locker a plurality of possible uses, and to do so for various applications (package delivery, object donation, foodstuff delivery or the like).

In one embodiment, the method furthermore comprises:
  receiving data relating to the object;
  determining the type of object on the basis of the received data;
  upon detecting use of the locker, processing the data delivered by the set of activated sensors in order to check whether the object deposited in the locker corresponds to the determined type of object according to at least one chosen criterion, and
  controlling the locking/unlocking member for locking/unlocking the locker according to a respectively positive/negative check on the deposited object.

Such an implementation makes it possible in particular, in one specific application, to check that the object placed in the locker actually corresponds to a description given beforehand by an entity responsible for returning the object to the locker. In such an application in particular, the sensors of the locker are selected and activated so as to allow this check.

In particular, there may be provision for at least some of the sensors of said selected set of sensors to be activated before the locker is locked, in order to check whether the object deposited in the locker conforms to data from among the data received in relation to the object.

Nevertheless, all or some of the sensors of the locker may then be used to monitor the object during storage. Thus, at least some of the sensors of said selected set of sensors may furthermore be activated after the locker is locked, in order to monitor the object deposited in the locker during the locking of the locker. For example, the locker may comprise at least one gas analysis sensor, activated for a type of object corresponding to a perishable foodstuff.

In one variant application in which the object has not been specifically described beforehand, the method may furthermore comprise:
  determining the type of object on the basis of data generated by at least one of the sensors of the selected set of sensors.

For example, determining the type of object may use one or more sensors of the locker, for example a camera that takes a digital photograph in order to compare it with an object database, and/or a pressure sensor for comparing the weight with data from the database. It is thus possible to automatically detect the object placed in the locker.

In one embodiment, the storage device comprises a plurality of lockers, and at least one locker is chosen, from among said plurality of lockers, to store objects on the basis of the type of object to be stored, and the method furthermore comprises:
  identifying a locker including the selected set of sensors and able to store the object.

Thus, even though a locker may comprise a large number of sensors and be assigned to a large number of possible uses within the meaning of the present invention, for specific storage of an object requiring a given type of sensor, it is possible, through this implementation, to select a particular locker from among a set of lockers in order to select this particular locker if it comprises the sensor suitable for the storage of a specific object. It will thus be understood that all of the lockers may form part of a system comprising a processing circuit capable of determining one or more lockers suitable for a given type of storage.

In one embodiment, the set of sensors that are activated for a given locker is able to be modified at least from one unlocking of the locker to a next unlocking, in particular on the basis of the type of object to be stored.

Thus, in this embodiment, a locker used for storing a given object is able to be reused for storing another object, possibly of a different type.

In the embodiment in which the data relating to the object are obtained, said data may comprise at least image data of the object, and the set of activated sensors comprises a camera able, in cooperation with a shape recognition module, to acquire at least one image of the object following the deposition of the object in the locker and to recognize at least one deposited type of object, the method then furthermore comprising:
  determining whether the image data of the object correspond to the recognized type of object.

As an alternative or in combination, the data relating to the object may comprise at least data about the weight of the object, and the set of activated sensors comprises a pressure sensor on a lower internal wall of the locker for weighing the object following the deposition of the object in the locker, the method then furthermore comprising:
  determining whether the weight measured by the pressure sensor corresponds to the weight of the object according to the received data.

In one general embodiment, it is possible to provide for the abovementioned locker to comprise one or more openings formed in at least one wall of the locker. The method may thus comprise:
  after selecting the set of sensors to be activated, routing at least one sensor of the selected set to the opening in the wall of the locker in order to at least partially insert this sensor into the locker.

In such an embodiment, it is then possible for example to pool sensors between a plurality of lockers that the storage device may comprise. Thus, if a sensor required by the type of object to be stored is not available in the locker intended to receive this object, there may be provision to route a homologous sensor to the opening of this locker.

Thus, in one embodiment in which the storage device furthermore comprises at least one housing for a plurality of sensors, the method may comprise:
  after selecting the set of sensors to be activated, checking availability of the sensors of the selected set in the locker,
  and, if at least one of the sensors of the set is unavailable in the locker, routing a sensor homologous to the unavailable sensor from the sensor housing to the opening of the locker.

As mentioned above, a sensor may be shared between a plurality of lockers and, depending on the respective storage monitoring requirements in the various respective lockers, a specific sensor may be chosen for the requirements of a given locker and there may then be provision to route this sensor from the abovementioned housing to the opening of this given locker.

In such an embodiment:
  the storage device comprises a plurality of lockers each comprising at least one wall comprising at least one opening,
  the housing comprises a plurality of distinct types of sensors at predetermined locations in the housing,
  the storage device furthermore comprises a routing member for routing a sensor from a location of this sensor in the housing to a locker opening.

The method may thus comprise:
  after selecting the set of sensors to be activated in a current locker, checking availability of the sensors of the selected set in the current locker,
  and, if at least one of the sensors of the set is unavailable in the current locker, directing the routing member to control the routing of a sensor homologous to the unavailable sensor from the location of the homologous sensor in the sensor housing to the opening of the current locker.

Of course, prior to any routing of a sensor to a current locker, it should be checked whether all of the sensors of the selected set are not already all present in this current locker.

The abovementioned routing member may comprise a gripping member (for example an articulated mechanical clamp or a magnetized head for attracting the metal parts of the sensor). The routing member may thus take the form of an articulated arm for example, or even comprise rails and/or cables for routing the sensors.

Such an embodiment is particularly advantageous as such. It may moreover furthermore target the routing of actuators to the abovementioned opening of a locker.

Such an actuator may for example be a light device (of LED or other type) for illuminating the inside of the locker or the like.

The present invention also targets a storage device comprising at least one locker equipped with a plurality of sensors and a processing circuit for implementing the above method.

Figure 5:
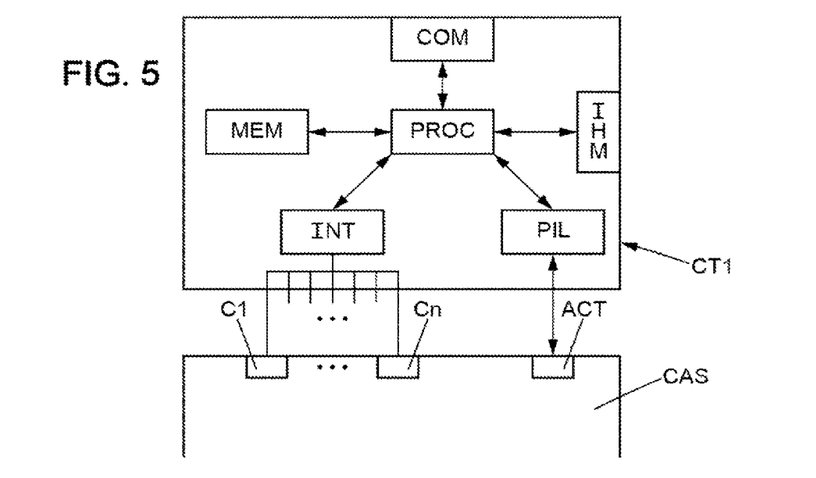
FIG. 5 schematically illustrates a processing circuit of a storage device proposed according to one or more embodiments.

One example of such a processing circuit is illustrated in FIG. 5, which is commented upon below.

The present invention also targets a system comprising:
  a server and
  a storage device comprising:
  at least one locker including a plurality of sensors,
  an actuator for locking/unlocking the locker,
  and a communication module for communicating with the server, the server comprising a processing circuit for:
  receiving a request to store an object in a locker,
  determining a type of object corresponding to the object to be stored;
  selecting, on the basis of the determined type of object, a set of sensors from among the plurality of sensors of the locker to be activated at least during use of the locker;
  upon detecting use of the locker, activating the selected sensors in order to monitor the storage.

Figure 3:
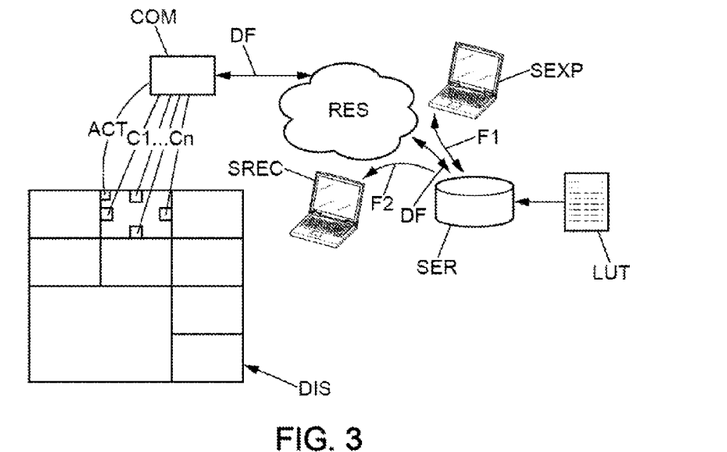
FIG. 3 illustrates a system comprising a storage device and a server according to one or more embodiments, cooperating via a wide area network in the example that is shown.

One example of such a system is illustrated in FIG. 3, which is commented upon below.

The server of the abovementioned system is an important element, and the present invention may furthermore target the server for managing storage of an object in a storage device, of a system within the meaning of the present invention.

Figure 6:
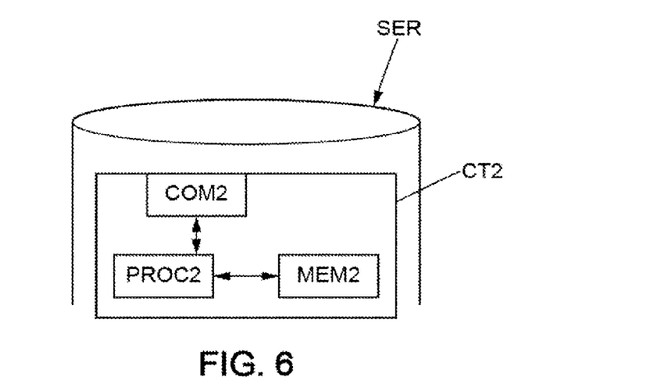
FIG. 6 schematically illustrates a processing circuit of a server proposed according to one or more embodiments.

One example of such a server and of its processing circuit is illustrated in FIG. 6, which is commented upon below.

The present invention also targets a computer program containing instructions for implementing the above method when these instructions are executed by a processor.

Figure 4:
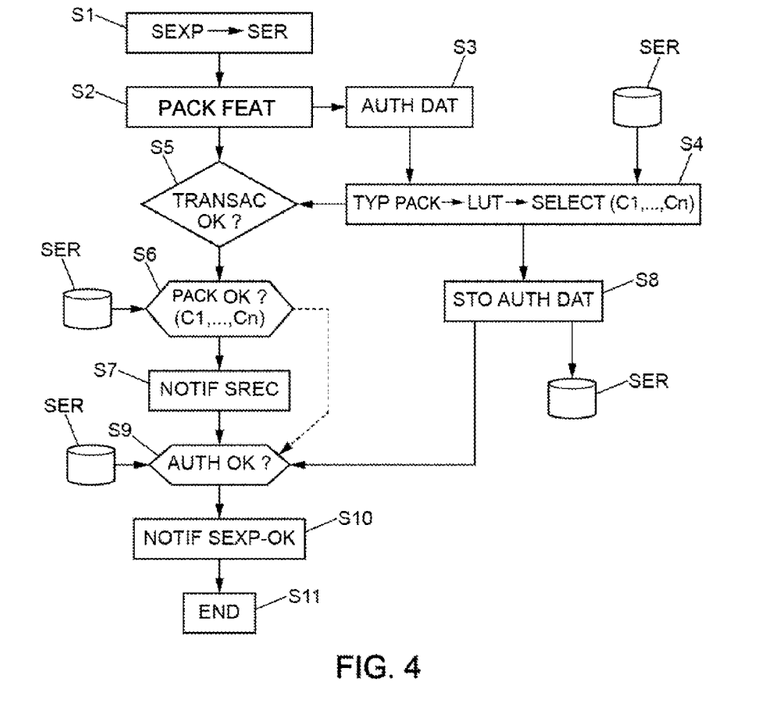
FIG. 4 shows an example of a method proposed according to one or more embodiments.

FIG. 4, which is commented upon below, illustrates one example of a general algorithm for such a computer program.

BRIEF DESCRIPTION OF THE DRAWINGS

Other features, details and advantages of the invention will become apparent on reading the following detailed description, and on analyzing the appended drawings, in which.

DETAILED DESCRIPTION OF ILLUSTRATIVE EMBODIMENTS

The invention makes it possible to offer communicating lockers for storing/distributing objects, grouped or not grouped into storage devices such as vending machines, and whose function and services associated with each of the lockers (and of the device itself) may vary over time depending on the requirements and uses of users and operators.

The functionalities of this new generation of storage/distribution devices may be, for example without limitation:
sales: of fruit, vegetables (bulk products or not), newspapers or any other consumer goods,
baggage lockers: deposition and retrieval of objects by one and the same person.
sending and retrieval of objects: packages, letters, etc.,
loaning of objects belonging to others with or without paid use: hardware such as a drill, a crepe maker, etc.,
donation of objects: for example a book, CD or other repository,
use for first aid or emergency: storage of goods relating to first aid or emergencies (defibrillator, fire extinguisher or the like) for use thereof in an emergency (fire, medical emergency).

The services of this type of storage according to the invention, by virtue of the use of one or more sensors (camera, gas sensor for recognizing foodstuffs or the like), may be for example (non-exhaustive list):

Accurately recognizing the object that is placed in a storage locker,
Measuring the weight of the object placed in the storage locker,
Measuring the volume of the object that is placed in the storage locker,
Analyzing the air inside and around the storage device,
Measuring the temperature inside and around the storage device.

This new communicating deposition/distribution device, the functionality of each of the "deposit areas" or "communicating lockers" of which may be reconfigured at any time according to the requirements of each user or of the operator, thus makes it possible to address issues such as:

Traveling less, by allowing users to use new functionalities linked to these vending machines (generally located in high-traffic areas such as urban public transport stations, which are central or with numerous connections and therefore very busy),
Consuming better and more responsibly, by having access to varied and/or local products (short trip) in one and the same location,
Limiting packaging, by allowing the self-service sale of bulk products,
Allowing everyone to rent/donate their own objects safely and securely,
Being able to directly sell what has been produced, and to optimize the use of surfaces available in dense areas by dynamically reconfiguring the functions and uses of each locker independently.

These communicating lockers may be offered individually, or grouped into various forms (such as in the form of vending machines), or in the form of a succession of larger storage lockers or the like.

They may themselves be reconfigured so as to offer variable storage volumes (by opening and/or retracting partitions between a plurality of adjoining lockers so as to create a higher-volume locker).

These communicating lockers may be installed statically (like current known vending machines or vending machines with lockers), or embedded in mobile equipment (vehicles, robots, drones, etc.).

Some communicating lockers may have a single functionality, and other lockers may have multiple functionalities that are able to be reconfigured dynamically, according to the wishes of the manufacturer or the operator of the lockers/storage device. Any enclosed space controlled by a controllable closure mechanism may potentially become a communicating locker.

This multifunctional deposition/distribution functionality may also make it possible to ascertain the habits of the people using it, by automatically analyzing how it is used, in particular by analyzing its various successive contents. The local ecosystem may even be analyzed and monitored (typically the observation of the interactions of clients with the various stored objects, according to various areas or types of area).

The physical structure of a locker device, its interconnections with remote applications, and usage examples are described in more detail below.

In the following text, the term "storage device" is understood to mean a connected device comprising:
one or more "locker" compartments,
one or more communication modules, for example in each locker, and
one or more sensors, for example in each locker, able to measure respective physical variables, and deliver respective signals that are able to be transmitted by the communication module of the locker to a remote entity.

Furthermore, the term "user" denotes without distinction a natural or legal person (the operator for example), a software application or component, a software or hardware system or subsystem, a connected or digital/dematerialized object (book, document or the like), or any other entity depending on the context of use of the invention, which places or causes the object to be placed in the locker or storage device. The term "client" denotes the person who then opens the locker or storage device in order to take the object therefrom.

Thus, a physical storage device groups together one or more connected lockers, and makes it possible to deposit and/or withdraw one or more objects by associating, with each locker or set of lockers containing an object, a set of precise functionalities at a given time.

This storage device may for example be constructed in the form of a vending machine for vending objects, of any other shape/size.

The storage device may be paired with a certain number of sensors/actuators, making it possible to offer functionalities specific to the storage device.

The locker, which is a physical storage area, is an area closed off by a door and confines the object in an enclosed space. The door is controlled by a processing circuit comprising the communication module for communicating with the locker in order to command opening or closure of the door, preferably remotely, when predefined conditions are met according to the function or the group of functions sought for the locker of the storage device.

The locker thus has door locking/unlocking equipment that ensures strict access control to the contents of the locker, or group of lockers. Implementing the authorizations required for access, for example the identification and authentication of the party present, may be based on the sensors and actuators associated with the locker. The sensors and actuators may be physically present on the locker, or group of lockers, or else placed in a nearby area compatible with the constraints for implementing the authorization to access the contents of the locker.

The locker is paired with sensors/actuators for offering functionalities specific to each locker, for example for measuring the storage conditions of the deposited product, the shape of the product, its weight, its condition (ripe foodstuff for example), for recognizing the functionalities or the potential use of the deposited product, its non-conformity, its hazardousness, etc.

The sensors may measure the physical variables of temperature, hygrometry, pressure (weight of the deposited object), gas detector (all types), camera, vibration sensor. The actuators may be, in addition to an electronic latch for locking/unlocking the door, a refrigeration device common to one or more lockers, a fire extinguisher, an alarm or the like.

Each locker may be paired with a set of these sensors/actuators in the same way, or in a different way, depending on the wishes of the user or the manufacturer/supplier of the storage device.

Figure 1:
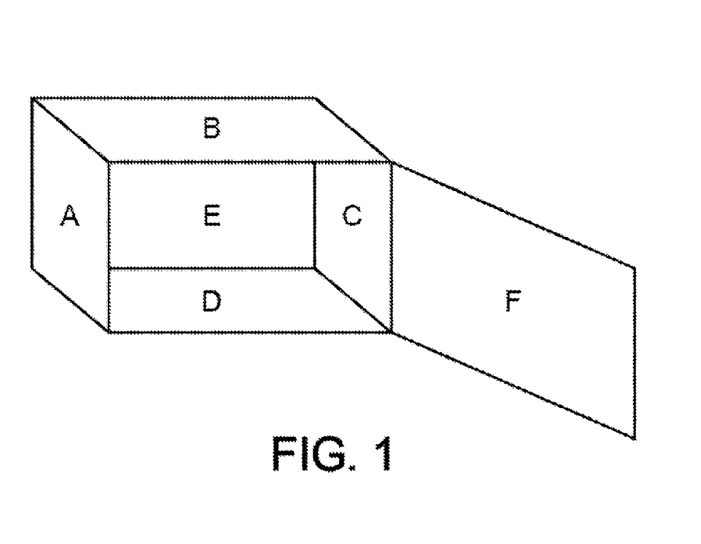
FIG. 1 illustrates a locker of a storage device proposed according to one or more embodiments.

A locker is illustrated in FIG. 1. These sensors/actuators may be positioned on any face of the locker, from A to F, as illustrated in FIG. 1, in which the reference F represents the door having the controllable lock (and being able to open from the right, the left, the top, the bottom, or in any other way).

The locker does not necessarily have a cubic shape as shown in FIG. 1, but may take any shape necessary or desired in order to perform its functions.

Implementing a function, or group of functions, associated with a locker, or group of lockers, may require having resources necessary to execute instructions of a computer program (for example a processor, a storage memory, a communication module, etc.). These resources may be allocated exclusively to a locker, or group of lockers, or else pooled within a group of lockers, or even belong to a system or subsystem (that is remote or not remote) other than the locker or group of lockers in question.

Figure 2:
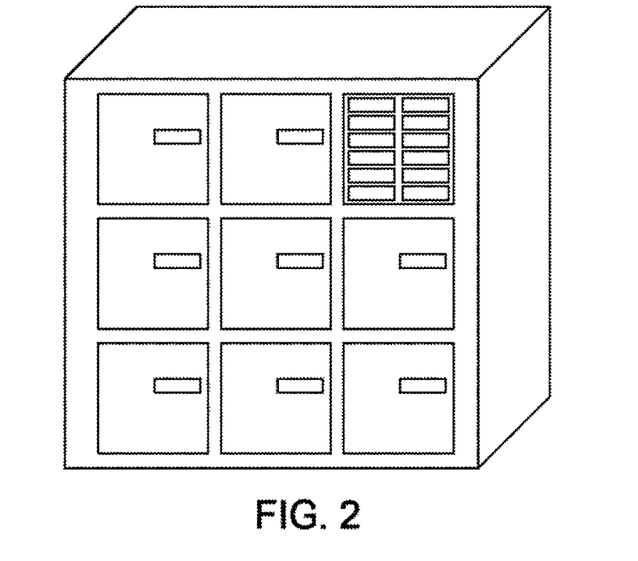
FIG. 2 illustrates a set of lockers of a storage device proposed according to one or more embodiments.

A storage device grouping together a plurality of lockers is illustrated in FIG. 2, with, in the example shown, a human-machine interface (at the top right of the storage device) for controlling the opening or the closure of each door of a locker of the device.

FIG. 3 illustrates one practical embodiment purely by way of illustration, in which:

the storage device DIS comprises one or more lockers (which are not necessarily of the same size, as shown at the bottom of FIG. 3 on the left), each locker may comprise a plurality of sensors $C1, \ldots, Cn$, for example positioned on one or more faces of the locker as required, as well as one or more actuators ACT for locking/unlocking the door of the locker, these various equipments $C1, \ldots, Cn$, ACT are connected to a communication module COM that is integrated or not integrated into the storage device DIS.

More particularly, the communication module COM is connected, for example via a wide area network RES, to a server SER (management server) of the locker manager.

Furthermore, this server SER may for example store in memory MEM2 (FIG. 6) a lookup table LUT that it may consult in order to determine, for a type of storage requested by a sending user, the sensors of the locker to be activated (or to bring to the locker as presented further below with reference to FIG. 8 in particular) from among the sensors $C1, \ldots, Cn$. Such an embodiment makes it possible to monitor whether the object deposited by the sending user actually corresponds to an object expected for this locker and/or to raise alarms in the event of a problem linked to storage (double-headed arrow DF to control the activation of sensors via the module COM and to feed the sensor measurements back to the server SER). For example, in one or more embodiments, the user who deposits the object may be equipped with a terminal SEXP (for example a smartphone, tablet, personal computer, laptop computer, or any electronic equipment designed to execute a software application on a processor (for example dedicated software application or web application executed from a browser) configured so as to perform the functions described below for the terminal SEXP in one or more embodiments) in order to define the features of the object to be stored and communicate the data of the object to the server SER (arrow F1 toward the server). As a variant, of course, the user may enter these data directly via a human-machine interface IHM (FIG. 5) of the storage device DIS, at the location, before depositing the object in the locker.

"Server" is understood in this document to mean any virtualized or non-virtualized point of service or any device performing data processing operations, one or more databases, and/or data communication functions. For example, and without limitation, the term "server" may refer to a physical processor that is operatively coupled to associated communication, database and data storage functions, or refer to a network, a group, a set or a complex of processors and associated data storage and networking equipment, as well as an operating system and one or more database system(s) and application software supporting the services and functions provided by the server. A computing device may be configured so as to send and receive signals, via wireless and/or wired transmission network(s), or may be configured for data or signal processing and/or storage operations, and may therefore operate as a server. Thus, equipment configured so as to operate as a management platform may include, by way of nonlimiting example, dedicated servers mounted on a rack, desktop computers, laptop computers, service gateways, sometimes called "boxes" or "home gateway", multimedia decoders, sometimes called "set-top boxes", integrated equipment combining various functionalities, such as two or more of the functionalities mentioned above. Management servers or platforms may vary widely in terms of their configuration or their capabilities, but a management server will generally include one or more central processing unit(s) and a memory. A management server may also include one or more mass memory equipment(s), one or more electric power supply (supplies), one or more wireless and/or wired network interface(s), one or more input/output interface(s), one or more operating system(s), such as Windows Server, Mac OS X, Unix, Linux, FreeBSD, or an equivalent.

The terms "network" and "communication network" as used in this document refer to one or more data links that may couple or connect possibly virtualized equipment so as to allow the transportation of electronic data between computer systems and/or modules and/or other electronic devices or equipment, such as between a management server and a communication module of a storage device as proposed in this document or of other types of device, including wireless terminals coupled or connected via a wireless network, for example. A network may also include a mass memory for storing data, such as a NAS, for "network attached storage", a SAN, for "storage area network", or any other form of computer-readable or machine-readable medium, for example. A network may comprise, in whole or in part, the Internet, one or more local area networks or LANs, one or more wide area networks or WANs, wired connections, wireless connections, cellular connections, or any combination of these various networks. Similarly, subnetworks may use various architectures or be compliant or compatible with various protocols, and interoperate with larger networks. Various types of equipment may be used to make various architectures or various protocols interoperable. For example, a router may be used to provide a communication link or a data link between two LANs that would otherwise be separate and independent.

Once the object has been deposited, the management server SER may be designed to notify the availability of the package to the terminal SREC of the recipient client (arrow F2). After the object has been retrieved (by a recipient (known or not known to the depositor) or by the depositor himself/herself), the communication module COM may be designed to signal the retrieval to the server SER, which may then be designed to notify the terminal SEXP that the object has actually been retrieved (arrow F1 toward the terminal SEXP), as explained in the comments below in FIG. 4.

The proposed method makes provision, in one or more embodiments, for a storage device comprising at least one locker including a locking/unlocking member (ACT) for locking/unlocking the locker and a plurality of sensors (C1, . . . , Cn) designed to deliver data specific to the objects deposited in the locker to receive a request to store an object in a locker of the storage device. This storage request may for example be received from a terminal with which a user is equipped. The terminal may be for example a smartphone, a tablet, a personal computer, a laptop computer, or any electronic equipment designed to execute a software application on a processor (for example dedicated software application or web application executed from a browser). The software application may then be configured so as to perform the functions described below for the terminal SEXP in one or more embodiments, following a command from the user made on his/her terminal via the application. Depending on the embodiment, the storage request may or may not comprise data relating to the object. Embodiments in which the depositing user communicates data data relating to the object to the data storage device, such as for example features of the object that the depositing user wishes to deposit in a locker of the storage device, are described below, in particular with reference to FIG. 4.

The proposed method furthermore makes provision to determine a type of object corresponding to the object to be stored. This determination may be performed in one or more embodiments, in whole or in part, by using data relating to the object and provided by the depositing user, as described below in the context of embodiments illustrated by FIG. 4.

In other embodiments, this determination may be performed, in whole or in part, by the storage device, in particular by using one or more sensors of the locker of the storage device in which the object will have been deposited by the depositing user. It may be triggered manually (for example upon the user's indication that the object has been deposited in the locker) or automatically upon detection that an object has been placed in a locker of the device (for example upon detection by a pressure sensor of the weight of the object following its return to the locker).

For example, when the locker in which the object has been deposited is equipped with a pressure sensor for measuring a weight of the object (or any other sensor able to measure a weight of the object or generate data relating to the weight of the object), the determination of the type of object may use weight data generated by the sensor.

In another example, when the locker in which the object has been deposited is equipped with a camera for acquiring visual data (an image, a video, etc.) relating to the object (or any other sensor able to acquire visual data relating to the object), the determination of the type of object may use visual data generated by the sensor.

In embodiments in which the determination of a type of object corresponding to the object to be stored is performed, at least in part, by the storage device, this determination may use one or more object and/or type of object databases, based on one or more data acquisitions performed by one or more of the sensors of the locker in which the object has been placed. For example, these data may be transmitted to one (or more) server(s) hosting these databases, which in turn transmit(s) type of object data as determined using the database or databases. The acquired data, to be compared with those in the database, may be for example image data, and an object recognition module may be implemented, evaluating for example a similarity score between the object whose image is acquired and images from the database.

In embodiments in which the determination of a type of object corresponding to the object to be stored is performed jointly on the basis of data relating to the object that are generated by the storage device, on the one hand, and on the basis of data relating to the object that are received by the storage device, on the other hand, the type of object data resulting from the determination by the storage device and the type of object data resulting from the determination performed on the basis of the received data may be combined in order to refine the determination of the type of object deposited in the locker.

In one or more embodiments, the proposed method then makes provision to select, depending on the determined type of object, a set of sensors from among the plurality of sensors of the locker to be activated at least during use of the locker. As described below, the determination of the set of sensors to be activated for use of the locker may take into account a determination of the type of object that led to determining that the object is of perishable foodstuff type, in order to allow the depositing user to manage storage times for perishable foodstuffs placed in lockers on the basis of images of these foodstuffs, taken at for example regular intervals by an image sensor of the locker, and transmitted to the depositing user, and/or on the basis of data generated by a gas analysis sensor.

In one or more embodiments, the proposed method furthermore makes provision to activate the selected sensors in order to monitor the storage upon detection of use of the locker.

The detection of use of the locker may vary according to the embodiment, and for example correspond to the detection that the locker has been locked, by the user or by the device upon command from the depositing user, or correspond to the reception of a user command, in particular in cases where the locker in which the object has been placed is not locked.

Monitoring the storage may correspond, depending on the embodiment, to more or less sophisticated storage management, for example in order to determine that the object is still placed in the locker or by contrast that it has been removed therefrom. In one or more embodiments, the monitoring may also comprise continuous monitoring of the object, for example in the case where the object is of perishable foodstuff type, as indicated above. Depending on the embodiment, the monitoring may thus be performed to varying degrees, depending on the use made of the locker and/or the object or type of object for which the storage device is used.

With reference now to FIG. 4, the terminal of the depositing user SEXP (or as a variant directly the interface IHM of the storage device), in one or more embodiments, may contact (S1) the server SER in order to communicate thereto features of the object that the depositing user wishes to deposit, as well as possibly the coordinates of the recipient user if the latter is known, for example an identifier associated with his/her terminal SREC.

The features of the object are then analyzed (S2) in order to determine which sensors are relevant, from among the sensors C1 to Cn, in relation to the type of storage required by the object. For example, if it is a basket of vegetables, a gas release sensor, capable of detecting the onset of decomposition of these perishable foodstuffs, may be selected (S4) from among the sensors to be activated during the storage of the object. Furthermore, for this example, a pressure sensor may be activated (S4) in order to weigh the object at the time when it is returned to the locker and determine whether the weight thus measured matches the previously analyzed features (S2). In another example, a photograph may be taken, for example from the front, of the object to be stored, in the case where it is an object other than a perishable foodstuff, the data from this photograph then forming part of the previously analyzed features (S2) of the object. A camera, as sensor, will thus for example be activated (S4) in order also to take a photograph of the object from the front and determine whether the object deposited in the locker actually matches the photographed object. Moreover, a weight of the object or other features may be provided (S2) in order to see whether it matches for example the weight measured by an appropriate sensor (pressure sensor for example for the weight) that was previously activated (S4), this being done at the time when the object is deposited.

Moreover, in one or more embodiments, the proposed storage method and device may be designed such that the depositing user is able to provide (S3) authentication data of the recipient client receiving the object for this locker, provided that the depositing user has such data relating to one or more recipients of the object (for example biometric data that the recipient will have previously communicated to the depositing user, or even an identifier and a password agreed with the recipient or the like).

Next, the server SER determines (S4) the set of sensors to be selected in order to activate them at the time when the object is inserted into the locker, in particular in order to check whether the object actually corresponds to the previously provided features (S2). In one or more embodiments, this check may be based on a lookup table LUT, which may list the sets of sensors appropriate for various types of objects, as well as possibly the lockers equipped with these appropriate sensors, and which are effectively available from among the bank of lockers. The server is thus also able to check the availability of such a locker.

If in particular:
the recipient's authentication data have been provided correctly,
the deposited type of object is authorized,
the locker able to accommodate this type of object is actually available, then the transaction may be validated (S5).

In this case, the server SER may store (S8) the recipient's authentication data, if these are known. These data may be used at the time when the recipient, if he/she is known, wishes to retrieve (S9) the object.

Once the transaction has been validated (S5), the depositing user may place the object in the locker reserved beforehand by the server SER, and the sensors of the locker that have been selected to be active (C1 . . . Cn for example) may determine (S6) whether the object actually corresponds to that which was the subject of the validated transaction (S5). This may involve for example a camera, as sensor, that takes a photograph of the object deposited in the locker and, with a shape recognition software module, determines whether the object actually corresponds to the object of the transaction, and/or even a weight sensor for determining conformity of the weight of the deposited object, or any other existing or future sensor, according to the requirements at the time and the use desired by the depositor.

To this end, at the time when the actuator ACT has to lock the door of the locker, the communication module COM transmits the data from the sensor or sensors involved to the server, which data are analyzed at the server, in order to determine conformity of the object. The actuator ACT locks the door only on the condition that the data fed back by the sensors actually correspond to those of the object that was the subject of the transaction. If this is the case, the actuator locks the door of the locker and the communication module COM feeds back information validating the deposition of the object to the server. Otherwise, the server SER may notify, via the interface IHM or on the depositor's terminal SEXP, the identifier (a number or the like) of the locker that should be used from among the lockers of the storage device, this locker being the one that has been reserved beforehand (S4).

It should furthermore be noted that the camera, associated with the shape recognition module, may, depending on the embodiment, make it possible to detect the presence of an unauthorized object (weapon, bomb, drug, living animal or the like) and for example trigger an alarm at the server.

Once the object has been placed in the appropriate locker, and it has been determined, if necessary, that the object actually corresponds to that of the validated transaction (S5), the server may notify (S7) the recipient of the object, if he/she is known, for example by sending a message to the recipient's terminal SREC, or notify any user interested in this type of object who has made himself/herself known to the system beforehand, so that a recipient is able to come and retrieve the object. The opening of the locker and the retrieval of the object may then be performed (S9) in a conventional manner per se, by authenticating the possible recipient by virtue of the data stored beforehand (S8) by the server. For example, the interface IHM of the storage device may receive an identifier and a password, or even biometric fingerprints of the recipient, and then feed these data back to the server SER via the communication module COM for comparison. If the data match, the server may then control the actuator ACT via the module COM so as to open the door of the locker.

In one or more embodiments, at least some of the sensors C1 ... Cn may remain active until the opening of the locker (S9), in particular in order to feed back to the server a problem linked to the storage, such as for example an onset of decomposition of perishable foodstuffs (illustrated by the arrow in dotted lines between references S6 and S9 in FIG. 4).

After the object has been retrieved (S9), the communication module COM may notify the server SER of this event, and the server may then notify this (S10) to the terminal of the depositing user SEXP, thereby ending (S11) the exemplary embodiment of the proposed method illustrated by the diagram in FIG. 4.

FIG. 5 illustrates one possible structure of a processing circuit CT1 fitted to a storage device comprising a locker or a set of lockers.

In particular, each sensor C1 ... Cn of a locker is connected to one (or more) input interface(s) INT of the processing circuit CT1. Moreover, the actuator for locking/unlocking the door of the locker is connected to a control module PIL for controlling the actuator ACT. In particular, each of these equipments INT, PIL are connected to one (or more) processor(s) PROC able to read instruction data from a computer program for implementing one or more embodiments of the proposed device, these instruction data being stored in a memory MEM connected to the processor PROC and that is contained in the processing circuit CT1. The processing circuit CT1 may furthermore comprise a human-machine interface IHM for the identification of users (by entering biometric fingerprints or a password, as indicated above, for example by the recipient of the object, if he/she is known), this interface IHM also being connected to the processor PROC. Finally, the processing circuit CT1 may typically comprise the communication module COM for communicating at least with the server SER, via a wide area network for example.

With reference to FIG. 6, the server SER itself comprises a processing circuit CT2 also equipped with a processor PROC2 and with a memory MEM2 storing at least instruction data from a computer program for implementing one or more embodiments of the proposed systems and methods (and in particular the actions S4, S8, S3, S6, S9, in cooperation with the processing circuit CT1 of the storage device presented with reference to FIG. 5) when these data are read by the processor PROC2. Of course, the processing circuit CT2 also comprises a communication interface COM2 for communicating with the communication modules COM of the remote storage devices.

Of course, the depictions in FIGS. 3 to 6 are illustrative, and given here by way of possible exemplary embodiments, which may be adapted differently depending on the applications and the various conceivable uses that are described below.

It will nevertheless be noted that the function of a locker of the proposed device may advantageously be modified when desired, for example, by a user of the locker or the administrator of the locker/storage device, thereby making it possible to offer the user various possible functionalities, depending on the object(s) that he/she deposits there, and the variety of uses that he/she may wish to make of a locker.

This function modification is performed for example via an application on a mobile telephone/tablet/computer, or a local human-machine interface (touch, voice, etc.) available on the locker itself or on the encompassing system, managing one or more lockers, such as the abovementioned storage device.

The function may likewise be modified through one or more programming interfaces (or "API" for Application Programming Interface).

Depending on the embodiment, a request to modify a function, or a group of functions, associated with a locker or group of lockers may trigger one or more of the following actions:

Identifying the requirements in terms of sensors and actuators required to implement the function requested from the group of lockers, Identifying computer processing functions and communications required to implement the function, Analyzing the presence and the state of the sensors and actuators available to execute the function, Analyzing the presence and the state of the computer processing unit and of the communications available to execute the function, Calculating the difference between expressed requirements and elements already present in order to define a target system configuration expressing requirements in terms of processing and communication resources, Analyzing the availability of the processing and communication resources accessible to a locker or a group of lockers, in order to define a distributed or centralized system having the resources required to implement the function or the group of functions, Reserving the resources for correctly executing the function or group of functions, Calculating the reconfiguration of the target system, which in particular comprises operations of: deploying appropriate software components on the execution resources, configuring deployed software components, configuring communication links, etc., Implementing reconfiguration operations on the target system, Activating the function or group of functions.

The proposed storage device may therefore be designed such that, in one or more embodiments, a user is able to deposit one or more objects in a locker, and that a function associated with this locker is then determined, for example via a local human-machine interface, or via a dedicated software application (on a mobile telephone, tablet, PC, or any other equipment).

Depending on the embodiments, the functionalities of the lockers may be more or less sophisticated, in particular in view of the sensors present in each locker. The locker may typically contain a camera for filming any object deposited inside. It may then offer a functionality for automatic detection of the type of object deposited in the locker, in the form for example of a computerized module for recognizing shapes in the images taken by the camera. This module may raise an alert via a communication module of the locker in order to prevent the insertion of an object of unexpected shape, or even of an object of suspicious shape, into the locker.

For example, in the case of package delivery, a delivery manager server may take an image of the package from the front and transmit it to a locker manager server following a transaction between the delivery manager server and the locker manager server.

Thus, when the package is inserted into the locker assigned to the package during the transaction, the camera may take an image of the package (by being arranged on the upper wall of the locker for example) and the shape recognition module may determine whether the image acquired by the camera of the locker corresponds to the image acquired during the transaction. For example, the shape recognition module may control the opening/closing actuator for opening/closing the locker so as not to authorize closure of the locker for as long as these two images do not match, or even make closure of the locker conditional on an additional check on the user (notification and waiting for a response on his/her mobile terminal for example), or else make closure of the locker conditional on an additional check for example on the weight of the package compared to an expected weight (this time using a pressure sensor on the bottom wall of the locker).

In another embodiment, the locker may have a gas detector and offer a functionality allowing the user (fruit producer for example) who has deposited his/her fruit in the locker to be informed that one of his/her fruit baskets is starting to decompose so that he/she is able to come and replace it.

In another embodiment, a locker may have a pressure sensor in order to ascertain the weight of a deposited object (a drill for example). In this case too, the pressure sensor may determine the weight of the object in order to identify a match with a presumed weight of the object at the time of a prior transaction, or with a previously determined weight. For example, if a user rents an object and brings it back to a locker in order to return it to the renter, the pressure sensor with which the locker is fitted may be used to check whether the weight of the returned object corresponds to the weight of the rented object (known to the renter), thus providing an element of checking that the returned object actually corresponds to the rented one.

The abovementioned sensors are only mentioned by way of example, and many other sensors may be used in these lockers depending on the embodiment.

In one or more embodiments, one and the same locker may be equipped with various sensors, thereby advantageously offering the possibility of dynamically reconfiguring the use, the functionalities and the behavior of a locker, or group of lockers, through the implementation of different sensors and actuators operated by computing functions complying with a target use. For example, at a given time, a locker may have the function of selling a basket of fruit and vegetables, and then serving as a package depot for a shipment, and then allowing the rental of an object, and then offering a free book or sleeping bag to whomever needs it.

In one or more embodiments, the sensors/actuators paired with each locker, as well as all of the hardware equipment (computing card, storage, type of interfaces with a user) may be activated completely or partially at any time, in particular when the user identifies himself to the locker or storage device for the purpose of storage provided beforehand during a transaction describing the nature of the package to be stored.

In one or more embodiments, the storage device is designed such that the users are initially able to register in a user database, for example via an application (dedicated application or web application) and/or via the local human-machine interface. A user registered in the database may be assigned rights to use the storage device, allowing him/her to pre-empt a free locker, remotely via the application or, if he/she travels to the location where the communicating lockers are located, to identify a free locker and to pre-empt it in order to use it. This user may then assign a function to this locker via the application or the local human-machine interface. Depending on the sensors/actuators installed within the locker, said locker may offer more or fewer value-added services or functionalities. The functionalities linked to the function assigned by the user are configured, based on configuration data for example stored on the management server and communicated to the storage device in order to configure the locker, and/or via the application or the local human-machine interface, such that said user is able to deposit the object in the locker and that, when the user closes the locker or commands closure of the door of the locker, the locker is configured so as to act as requested by its new function.

Thus, in one or more embodiments, each communicating locker may be configured with any type of sensor/actuator, from the simplest to the most complicated, making it possible to offer any type of service and functionality on the basis of the hardware possibilities that are offered.

In one or more embodiments, the storage device, which groups together the communicating lockers, may itself be paired with any type of sensor/actuator, so as to also have its own locally or remotely accessible functionalities, for example for administration, (self)-diagnosis of the correct operation of the lockers that it contains, detection of the number of crossings in front of the storage device, detection of an unauthorized attempt to open a locker with taking of a photograph of the unauthorized user, statistics on the use of each locker, on the habits of the people using them, etc.

In order to maintain the storage device, there may be provision, in one or more embodiments, for the possibility to physically remove a sensor, an actuator or another connected part of the locker equipment, and/or to add one or more equipments thereto that are not originally provided (sensors, actuators or the like). The addition of sensors and actuators, but also of execution or communication resources, may take place within the locker, or group of lockers, but also more broadly within the context of defining target systems linked to the function, or group of functions, to be implemented. Any configuration modification may be made visible, for example by a step by step notification mechanism as proposed by the UPnP protocol, or within a register as proposed by systems based on "brokers".

This addition of equipment may be used by a service deployed for the locker itself, or by a service of the system incorporating the locker (the storage device), or by any other local or remote equipment (including the locker and/or storage device) that may require the use of the capabilities of this new equipment.

Thus, for example, in one or more embodiments, a user may choose, for example and without limitation, via an application on a mobile terminal (smartphone or the like, connected to a server of the storage device manager) or a local interface contained in the storage device, one of the functionalities explained below, if the hardware configuration (sensors/actuators) linked to the selected locker allows this.

The baggage locker, first of all, allows objects to be deposited and retrieved by one and the same person. A user deposits an object there and closes the locker. Only this same user is able to retrieve this object later on.

The sale of fruit, vegetables, and other foodstuffs, or even newspapers, or any other goods may take place as follows. A farmer may decide to deposit a basket of fruit, a kilogram of carrots or a bag of potatoes, and then tell an interface of the locker that he wishes to sell this product at a specific price. This functionality allows the door of the locker to be opened only if a buyer pays the amount indicated to retrieve the product. It will be understood here that the actuator of the locker, in order to unlock the door, is connected to a payment verification module (bank card payment terminal, cash payment or the like).

The storage device may thus be configured so as to update a database of objects and goods for sale, consulted by the application, so that all of the users of the application are able to be informed thereof if they wish to purchase this object/ these goods. Moreover, any user interested in the object/the goods may reserve these goods for a limited time (with or without prepayment), the time it takes to travel to the storage device, identify himself/herself and, after finalizing the payment, retrieve the desired object/goods. The depositor/ owner of the object/goods offered for sale, once duly identified, may come and retrieve same at any time without paying the requested amount.

The retrieval of packages, letters and various objects may take place for example as follows. A deliverer deposits a package in a locker (for example near the destination address). The deliverer indicates, via a mobile application or the local interface, that the package is deposited in this locker and has a client registered in the application as its recipient. The client is then informed by the mobile application that a package is waiting for him/her in this locker. He/she is thus able to come and collect it when he/she wants (within a reasonable/legal period under penalty for example of his/her package being returned to the sender or paying a tax related to the duration of the storage). By identifying himself/herself once at the location (using an identifier and password for example, or through biometric fingerprint recognition or the like), the locker opens its door in order to deliver the package. It will be understood here that the actuator of the locker, in order to unlock the door, may be connected to a module for checking the identity of the client (for example via an interface for entering the identifier/ password or biometric fingerprint of the client, or through recognition of a client terminal though near-field reading or the like, or through any other means).

Packages and letters may thus be shipped. A user deposits a package in a locker. The user configures the function of the locker for "sending packages" via the application on his/her mobile or via the local human-machine interface. The delivery manager is informed that a package must be picked up in precisely this locker. When the deliverer comes to retrieve the package, he/she identifies himself/herself at the location, and the locker(s) containing the package(s) to be removed open(s) so that the package(s) is (are) retrieved. Depending on the level of functionalities present in the locker or the storage device, the sender of the package may be informed at this time via the mobile application that his/her package has actually been removed.

Moreover, the storage device or the application may be configured so as, on the basis of information provided by the user sending the package, to inform a delivery company to come and collect the package initially placed in a first locker by the sender of the package. The delivery company then transports the object from the first locker to a second locker for the retrieval of the package. Depending on the functionalities of the communicating locker, it is possible to offer the depositor of the package an acknowledgement of receipt when the package is removed by the delivery company, or any other functionality.

The loan or rental of objects may take place as follows. A user who owns an object that he/she does not use any more or uses infrequently (for example a drill, a crepe maker, a baby monitor or the like) may wish to make it available to anyone who may need it as a one-off. The user therefore brings such an object and deposits it in a free locker. The user informs the storage device, via the application or via a local human-machine interface, that he/she has deposited the rental object in this locker, and that he/she wishes to rent out this object at a price that he/she sets himself/herself (per hour, per day, per week, etc.). The actuator closes the locker and updates the function of the locker so that it does not open unless a third person identifies himself/herself and agrees to pay the indicated price. The rental may run for as long as the third person has not returned the object to a similar free locker (the same or any other locker offering identical or equivalent functionalities, situated in the same location or elsewhere). If the owner wishes to retrieve his/her goods, he/she identifies himself/herself on the storage device where his/her object is located (located via the mobile application), and the locker opens in order to allow him/her to retrieve it.

In this embodiment, a user may consult the mobile application when looking for a particular object. The application may geolocate the user and provide him/her with the location of the nearest storage device containing this object. The user may reserve the object if he/she wishes via the application and then travel to the indicated location. He/she identifies himself/herself at the location, and retrieves the desired object.

Once he/she has finished using the object, the user has to return it to an available storage device. He/she identifies himself/herself to the storage device, indicates that he/she is returning a rented object, deposits it in the storage device, and closes the door again so that the storage device is able to validate the return of the object. If the storage device has a camera, or a weight sensor, it is possible to offer for example a function for visually checking that the object returned to the storage device is identical to the one that was borrowed, or else that its weight is identical.

A first aid application in an emergency situation may take place as follows. Based on the principle of loaning, it is possible to use the same method to store first aid or emergency goods there (defibrillator, fire extinguisher, first aid, etc.), allowing them to be retrieved and used quickly in case of emergency. The user travels to the storage device, identifies himself/herself, indicates the type of emergency situation (fire, medical emergency or the like), and/or the first aid object that he/she wishes to retrieve.

The storage device then opens the door of a locker containing equipment suitable for the situation in order to retrieve the first aid goods. There may be provision for a mechanism for recording the identity of the user by photographing the user or by reading an identity document in order to avoid any improper or fraudulent use of the device.

It is possible to contemplate the use of such a service by people who have not registered beforehand in a user database, for example by dialing an emergency number on the local human-machine interface, or via the application for locating and opening these communicating lockers without prior subscription or registration.

An object donation application may take place based on the same model as book repositories. A user may wish to donate an object rather than rent it. He/she thus deposits the object that he/she wishes to donate in a locker, provides information via the mobile application or the local human-machine interface that this object may be retrieved free of charge, and the system modifies its function so as to open the locker when a third person requests it.

Typically, the application may geolocate the user and tell him/her the nearest storage device in which a particular object, available free of charge if appropriate, is located. The user travels to the storage device, identifies himself/herself, indicates which object he/she wishes to retrieve, and, since the object has been declared as a donation by the previous owner, the storage device opens the door for him/her so that he/she is able to retrieve it free of charge. Once the door has been closed again, the storage device updates the application database in order to indicate that this object is no longer available/that the locker is empty.

A user may furthermore delegate rights to another user. Typically in the case of retrievals, this functionality may be useful for example for an elderly person delegating a right to retrieve his/her packages to his/her personal assistant for situations where he/she does not feel able to go and retrieve the package himself/herself (fatigue, poor health, bad weather, weight of the package, etc.). The delegation of rights may be temporary or permanent.

Figure 7:
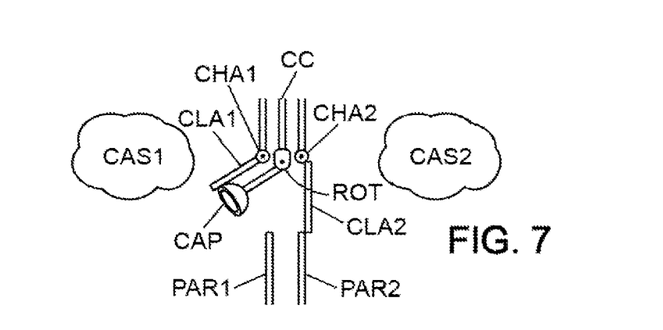
FIG. 7 illustrates one possible exemplary embodiment of the pooling of a sensor, in this case between two lockers, in a sectional view of a common partition between the two lockers CAS1 and CAS2, this partition comprising two parallel walls PAR1 and PAR2.

Reference is now made to FIG. 7 in order to describe an embodiment in which, in this case, one and the same sensor CAP may be shared between two lockers CAS1 and CAS2. The two lockers have a common partition defined by two walls referenced PAR1 for the locker CAS1 and PAR2 for the locker CAS2. Part of each wall PAR1, PAR2 is retractable in order to free up an opening through which the sensor CAP is able to pass into one of the lockers (the locker CAS1 in FIG. 7). To this end, a shutter CLA1 may be provided, pivoting on a hinge CHA1, formed in the first wall PAR1 in order to free up the opening of the first locker CAS1 and thus allow the sensor CAP to pass into the first locker CAS1. Of course, a shutter CLA2 is provided symmetrically, pivoting on a hinge CHA2, formed in the second wall PAR2 in order to free up the opening of the second locker CAS2 and thus possibly allow the sensor CAP to pass into the second locker CAS2. Thus, the sensor CAP (for example a camera or the like) is able to pivot from a first position in the first locker CAS1 to a second position in the second locker CAS2, by virtue of a pivoting member pivoting about a ball joint ROT to which the sensor CAP is connected. It should be noted that the sensor CAP may also be "stowed" in an intermediate position between the two walls PAR1 and PAR2. There is of course provision for a connection CC of the sensor CAP, for example for its supply of electric power and/or communicating data that it (CAP) senses.

Figure 8:
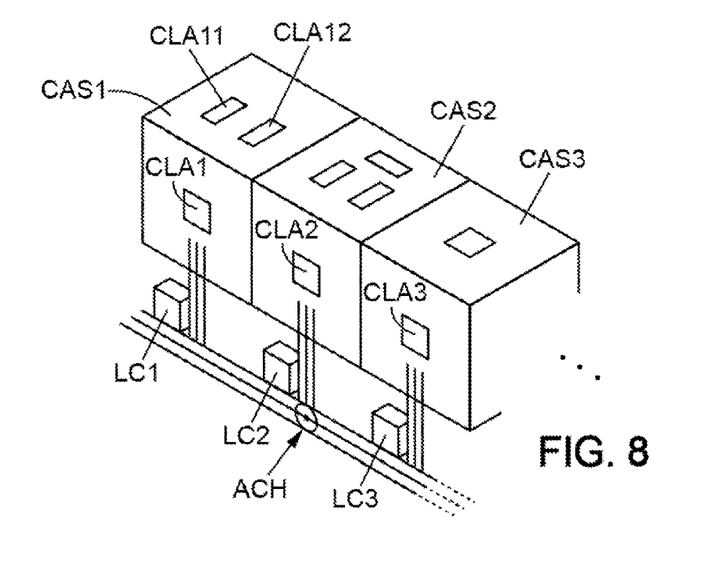
FIG. 8 illustrates an embodiment of sharing a plurality of sensors between a plurality of lockers comprising at least one wall in which at least one opening is formed.

Reference is now made to FIG. 8 in order to describe one general embodiment, which may optionally incorporate the embodiment illustrated in FIG. 7, and in which all of the sensors are initially housed in one or more sensor housings LC1, LC2, LC3, etc. In the example illustrated, each locker CAS1, CAS2, CAS3, etc. furthermore comprises at least one opening CLA1, respectively CLA2, CLA3. Each locker may comprise other openings CLA11, CLA12 for the insertion of sensors, in identical or different numbers. The openings may optionally be covered with a retractable shutter, as illustrated in FIG. 7. In particular, a routing member ACH is configured so as to route each sensor from a housing LC1 to a locker opening CLA1, CLA2, CLA3. The routing member ACH may comprise a mechanical clamp that is articulated and guided on rails (or by cables) for holding a sensor in a housing LC1, LC2, etc. and routing it to an opening CLA1, CLA2, etc. of a locker. The routing member ACH may alternatively comprise a magnetic head for attracting metal parts of each sensor and then moving a sensor held in this way.

For example, there may be provision for a set of sensors of various types in the housing LC2 between the two adjacent lockers CAS1 and CAS2 and which may be routed to the openings CLA1, CLA2 of these lockers CAS1 and CAS2. The set of sensors housed in the housing LC2 may thus be shared between the locker CAS1 and the locker CAS2. The same applies for the sensors of the housing LC3, which are shared between the locker CAS2 and the locker CAS3, etc.

Typically, it is possible to provide a plurality of sensors of the same type (a camera for example) in a housing LC2 when a particular type of sensor is often requested for all of the lockers CAS1, CAS2, or else such that, in the event of failure of a sensor of this type, it is possible to route a replacement sensor into the housing.

As an alternative to this embodiment, provision may be made for housings for respective types of sensors and to route a sensor of each type, selected in step S4 of FIG. 4, to a current locker to be equipped for the purpose of imminent storage.

Figure 9:
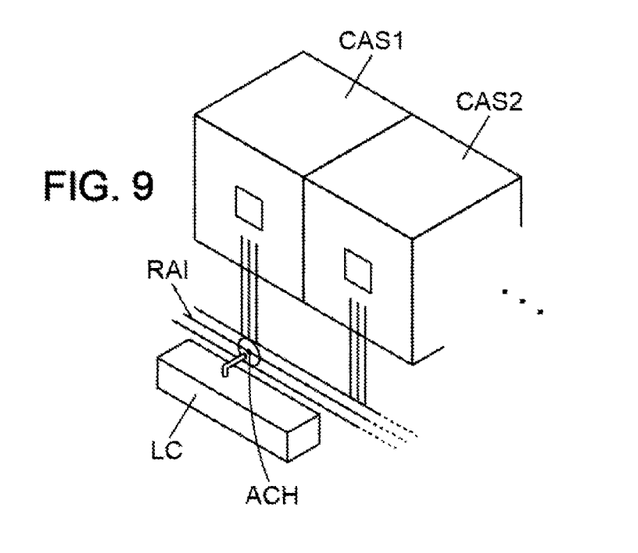
FIG. 9 illustrates another embodiment of sharing a plurality of sensors between a plurality of lockers.

Of course, with reference to FIG. 9, it is also possible to provide a single housing LC for all of the types of sensors, for example parallel to the rail RAI that serves a whole set of lockers, as illustrated in the example of FIG. 9.

It will furthermore be noted, in any of the embodiments of FIGS. 8 and 9 in particular, that the means for routing the sensors/actuators are able to move in three dimensions (horizontal, vertical, forward/backward, and any combination between these movements). It furthermore makes it possible to transport not only one, but possibly a plurality of sensors/actuators at the same time to the locker to be equipped (typically a block of sensors chosen for a given type of monitoring).

Of course, these functionalities are only examples of possible services of such communicating lockers. Other functionalities are also possible, depending on the uses and requirements of the users.

Depending on the embodiment chosen, some acts, actions, events or functions of each of the methods described in the present document may be performed or take place in an order different from that in which they have been described, or may be added, combined or else may not be performed or may not take place, as the case may be. Furthermore, in some embodiments, some acts, actions or events are performed or take place concurrently and not successively.

Although they are described through a certain number of detailed exemplary embodiments, the systems, storage devices, platform(s), servers, user equipment and methods that are proposed comprise various variants, modifications and refinements that will become obviously apparent to a person skilled in the art, it being understood that these various variants, modifications and refinements form part of the scope of the invention, as defined by the following claims. In addition, various aspects and features described above may be implemented together or separately or else substituted with one another, and all of the various combinations and sub-combinations of the aspects and features form part of the scope of the invention. Furthermore, it may be the case that some systems and equipment described above do not incorporate all of the modules and functions described for the preferred embodiments.

The invention claimed is:

1. A method for managing storage of objects in a storage device having:
   at least one locker including a locking/unlocking member for locking/unlocking the locker, and
   a plurality of sensors designed to deliver data specific to the objects deposited in the locker;
   wherein the method comprises:
   receiving a request to store an object in a locker of the storage device;
   determining a type of object corresponding to the object to be stored based on:
     data related to the object generated by the storage device; and
     data related to the object received by the storage device;
   selecting, on the basis of the determined type of object, a set of sensors from among the plurality of sensors to be activated at least during use of the locker;
   upon detecting use of the locker, activating the selected sensors.

2. The method according to claim 1, furthermore comprising:
   upon detecting use of the locker, processing the data delivered by the set of activated sensors in order to check whether the object deposited in the locker corresponds to the determined type of object according to at least one chosen criterion, and
   controlling the locking/unlocking member for locking/unlocking the locker according to a respectively positive/negative check on the deposited object.

3. The method according to claim 1, wherein the data relating to the object generated by the storage device comprise at least image data of the object, and the set of activated sensors comprises a camera able, in cooperation with a shape recognition module, to acquire at least one image of the object following the deposition of the object in the locker, the method furthermore comprising:
   determining whether the captured image data of the deposited object correspond to the image data relating to the object.

4. The method according to claim 1, wherein the data relating to the object generated by the storage device comprise at least data about the weight of the object, and the set of activated sensors comprises a pressure sensor on a lower internal wall of the locker for weighing the object following the deposition of the object in the locker, the method furthermore comprising:
   determining whether the weight measured by the pressure sensor corresponds to the weight of the object according to the received data.

5. The method according to claim 1, wherein said at least one locker comprises at least one wall in which at least one opening is formed, the method comprising:
   after selecting the set of sensors to be activated, routing at least one sensor of the selected set to said opening in order to at least partially insert this sensor into the locker.

6. The method according to claim 5, wherein the storage device furthermore comprises at least one housing for a plurality of sensors, the method comprising:
   after selecting the set of sensors to be activated, checking availability of the sensors of the selected set in the locker,
   and, in response to at least one of the sensors of the set being unavailable in the locker, routing a sensor homologous to the unavailable sensor from the sensor housing to the opening of the locker.

7. The method according to claim 6, wherein:
   the storage device comprises a plurality of lockers each comprising at least one wall comprising at least one opening,
   the housing comprises a plurality of distinct types of sensors at predetermined locations in the housing,
   the storage device furthermore comprises a routing member for routing a sensor from a location of this sensor in the housing to a locker opening,
   the method comprising:
   after selecting the set of sensors to be activated in a current locker, checking availability of the sensors of the selected set in the current locker,
   and, in response to at least one of the sensors of the set being unavailable in the current locker, directing the routing member to control the routing of a sensor homologous to the unavailable sensor from the location of the homologous sensor in the sensor housing to the opening of the current locker.

8. The method according to claim 1, furthermore comprising:
   determining the type of object on the basis of data generated by at least one of the sensors of the selected set of sensors.

9. The method according to claim 1, wherein the storage device comprises a plurality of lockers, and at least one locker is chosen, from among said plurality of lockers, to store objects on the basis of the type of object to be stored, the method furthermore comprising:
   identifying a locker including the selected set of sensors and able to store the object.

10. The method according to claim 1, wherein the set of sensors that are activated for a given locker is able to be modified at least from one unlocking of the locker to a next unlocking, in particular on the basis of the type of object to be stored.

11. A storage device comprising:
   at least one locker including a locking/unlocking member for locking/unlocking the locker;
   a plurality of sensors designed to deliver data specific to objects deposited in the locker; and
   a processing circuit configured to:
   receive a request to store an object in a locker of the at least one locker;
   determine a type of object corresponding to the object to be stored based on:
     data related to the object generated by the storage device; and
     data related to the object received by the storage device;
   select, on the basis of the determined type of object, a set of sensors from among the plurality of sensors to be activated at least during use of the locker; and
   upon detecting use of the locker, activate the selected sensors.

12. The storage device according to claim 11, wherein the locker comprises at least one wall in which at least one opening is formed, and the storage device furthermore comprises a routing member for routing at least one sensor of the selected set to said opening in order to at least partially insert this sensor into the locker.

13. The storage device according to claim 12, wherein the storage device furthermore comprises at least one housing for a plurality of sensors, the routing member being designed to route a sensor of the selected set from the sensor housing to the opening of the locker.

14. An object storage management system, comprising:
   a server; and
   a storage device comprising:
      at least one locker including a plurality of sensors,
      an actuator for locking/unlocking the locker,
      and a communication module for communicating with the server,
   the server comprising a processing circuit configured to:
      receive a request to store an object in a locker of the at least one locker,
      determine a type of object corresponding to the object to be stored based on:
         data related to the object generated by the storage device; and
         data related to the object received by the server;
      select, on the basis of the determined type of object, a set of sensors from among the plurality of sensors to be activated at least during use of the locker;
      upon detecting use of the locker, activate the selected sensors.

15. A non-transitory computer readable medium, having stored thereon software instructions that, when executed by a processor, cause the processor to implement a method for managing storage of objects in a storage device when said instructions are executed by a processor, the storage device having:
   at least one locker including a locking/unlocking member for locking/unlocking the locker, and
   a plurality of sensors designed to deliver data specific to the objects deposited in the locker;
wherein the instructions configure the processor to:
   receive a request to store an object in a locker of the storage device;
   determine a type of object corresponding to the object to be stored based on:
      data related to the object generated by the storage device; and
      data related to the object received by the storage device;
   select, on the basis of the determined type of object, a set of sensors from among the plurality of sensors to be activated at least during use of the locker;
   upon detecting use of the locker, activate the selected sensors.

* * * * *